W. BULLOCK.
Hand-Seeder.
No. 9,381. Patented Nov. 2, 1852.
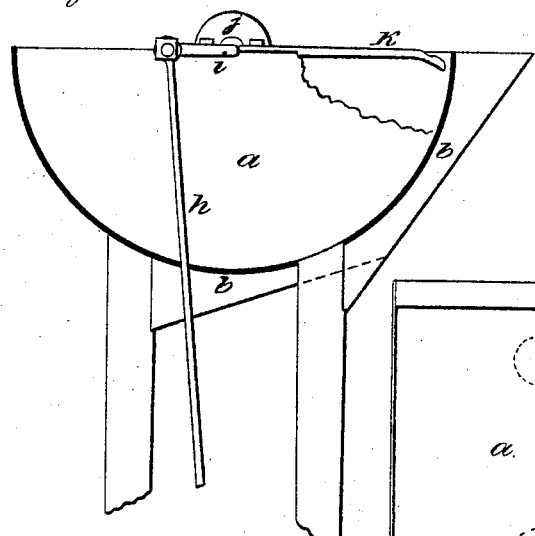
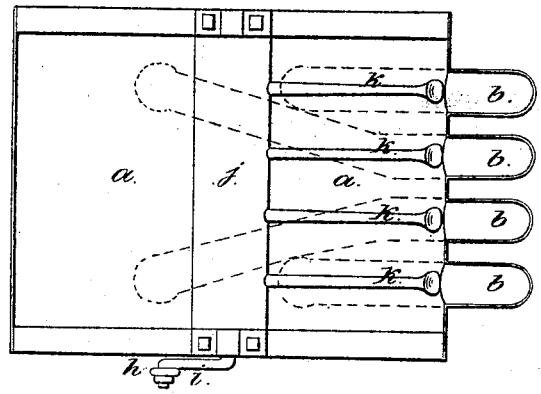
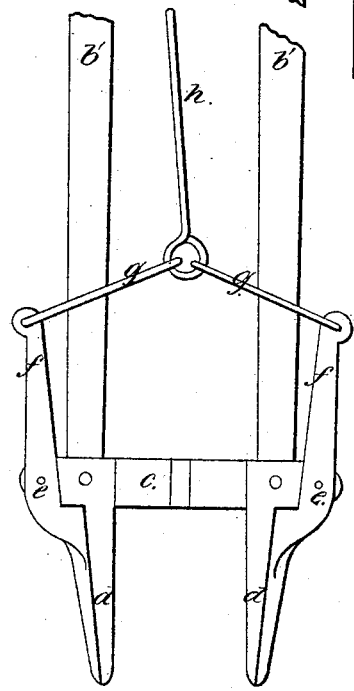
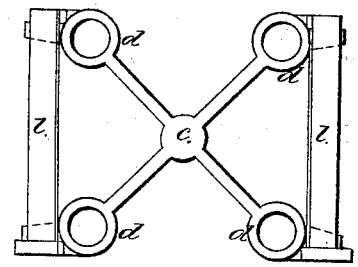

UNITED STATES PATENT OFFICE.

WILLIAM BULLOCK, OF PHILADELPHIA, PENNSYLVANIA.

IMPROVEMENT IN HAND SEED-PLANTERS.

Specification forming part of Letters Patent No. 9,381, dated November 2, 1852.

*To all whom it may concern:*

Be it known that I, WILLIAM BULLOCK, of the city and county of Philadelphia, in the State of Pennsylvania, have invented certain new and useful Improvements in Corn-Planters; and I do hereby declare that the following is a full, clear, and exact description of the same, in which—

Figure 1 represents my machine as a side elevation, consisting of a semicylindrical receiver, $a$, with the conducting-receivers $b$, on one side; $b'$, conducting-pipes for the grain from the receivers $b$ to the casting $c$. This casting has four dischargers, $d$, which holds the grain until dropped to the ground by means of the action of the jaws, one being stationary, while the other is movable. The movable one is secured at the point $e$ by a bolt, and a projecting arm, $f$, of the same is connected to a pitman, $h$, by means of the rods $g$. The pitman $h$ is attached to the crank $i$ of the cylindrical piece $j$. To this piece are attached the arms $k$, having at their extreme end an arrangement for raising the grain.

Fig. 2 is a plan or top view, showing the grain-receptacle $a$, receivers $b$, and their connection with the pipes $b'$ by dotted lines, arms $k$, and piece $j$, with the crank $i$ and attachment.

Fig. 3 is a top view of the casting $c$, dischargers $d$, and arm $f$, and connecting-bar $l$, to insure a uniform discharge of the grain.

Action: Place the grain in the receptacle $a$, turn the piece $j$ back, (drawing represents the arm $k$ as having discharged the grain,) and as the arm $k$ is drawn back the jaws of the dischargers $d$ open and allow the grain to escape. This is effected by means of the pitman-rods, &c.

What I claim herein as new and of my invention, and desire to secure by Letters Patent, is—

1. A seed-planter having a tube or tubes, $b'$, which in operating the planter is or are closed when placed in the ground, and so arranged that it or they can be opened while in the ground, for the purpose of letting the seeds out.

2. The arrangement of two or more tubes, $b'$ and $b$, in such a manner that the operator can place the seeds in a hill at specified distances apart.

3. The feeders $k$, having a sloping cavity at the outer ends, and being so arranged that as the seeds are carried up they will slide out and pass into the tubes.

4. The arrangement of the feeders $k$ and jaws $e$ and $d$, or valves, of the tubes $b'$, in connection with the handle by which the machine is carried, so that the feeders and jaws or valves can be operated by the same hand with which the machine is carried.

WM. BULLOCK.

Witnesses:
I. B. MURPHY,
JOEL COOK.